US005621421A

United States Patent [19]
Kolz et al.

[11] Patent Number: 5,621,421
[45] Date of Patent: Apr. 15, 1997

[54] ANTENNA AND MOUNTING DEVICE AND SYSTEM

[75] Inventors: Arvin L. Kolz; C. Edward Knittle, both of Lakewood, Colo.

[73] Assignee: The United States of America as represented by the Secretary of Agriculture, Washington, D.C.

[21] Appl. No.: 316,900

[22] Filed: Oct. 3, 1994

[51] Int. Cl.[6] .................................................. H01Q 1/12
[52] U.S. Cl. ........................ 343/892; 343/891; 343/705
[58] Field of Search .................................. 343/892, 893, 343/890, 891, 705, 708; 248/538, 74.1; H01Q 1/12

[56] References Cited

U.S. PATENT DOCUMENTS

| 2,398,357 | 4/1946 | Campbell | 343/705 |
| 2,452,073 | 10/1948 | Schivley et al. | 343/705 |
| 2,496,646 | 2/1950 | Winer | 343/892 |
| 2,505,751 | 5/1950 | Bolljahn | 343/705 |
| 2,630,531 | 3/1953 | Finneburgh, Jr. | 343/892 |
| 4,336,543 | 6/1982 | Ganz et al. | 343/705 |
| 5,182,566 | 1/1993 | Ferguson et al. | 343/705 |
| 5,204,688 | 4/1993 | Loiseau et al. | 343/891 |

FOREIGN PATENT DOCUMENTS 1244688  9/1960  France ................................ 343/892

Primary Examiner—Hoanganh T. Le

[57] ABSTRACT

An antenna and mounting device assembly fits on opposite sides of an aircraft to handle radio signals during flight. The antenna has a boom and radiating elements extending normal to the boom. The mounting device includes a first clamping bracket that attaches to the exterior of the aircraft, a pair of spaced arms that are twisted relative to the longitudinal axis of the first clamping bracket to orient the antenna relative to the horizontal and a second clamping bracket that attaches to the antenna.

21 Claims, 4 Drawing Sheets

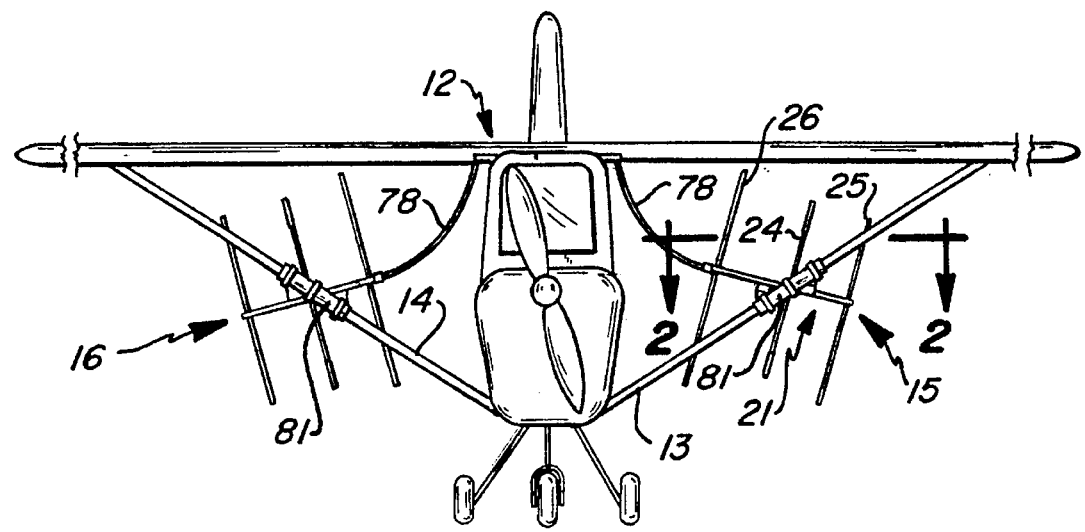
Fig_1
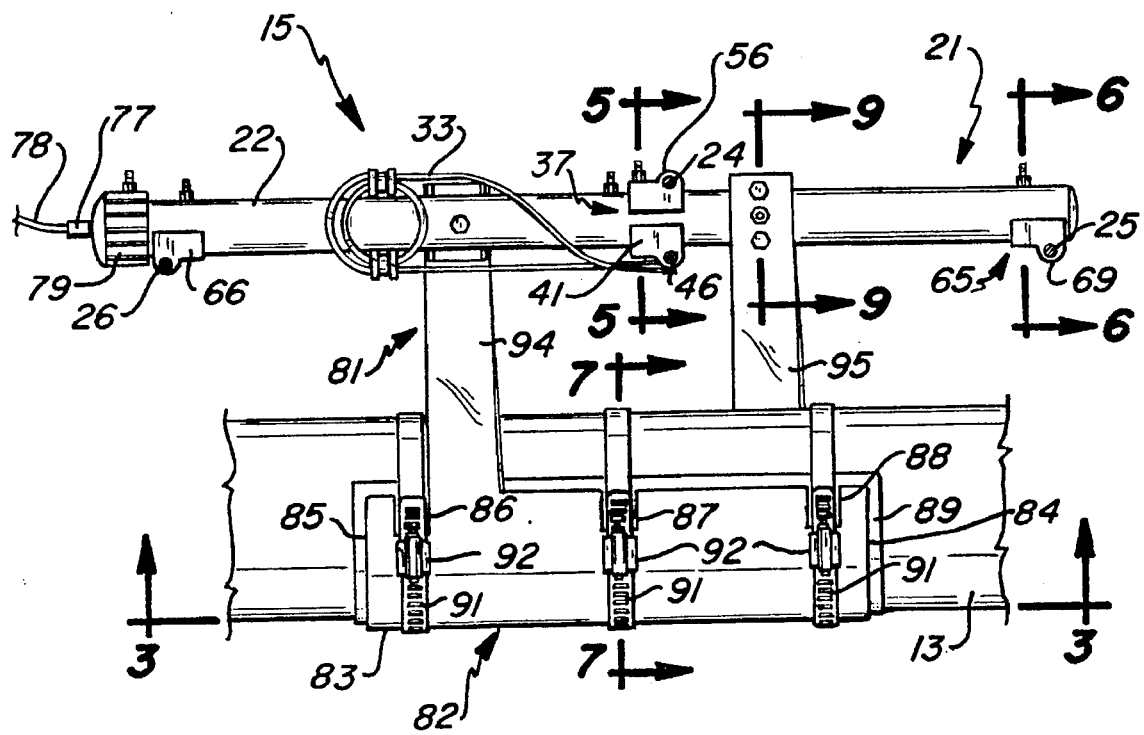
Fig_2

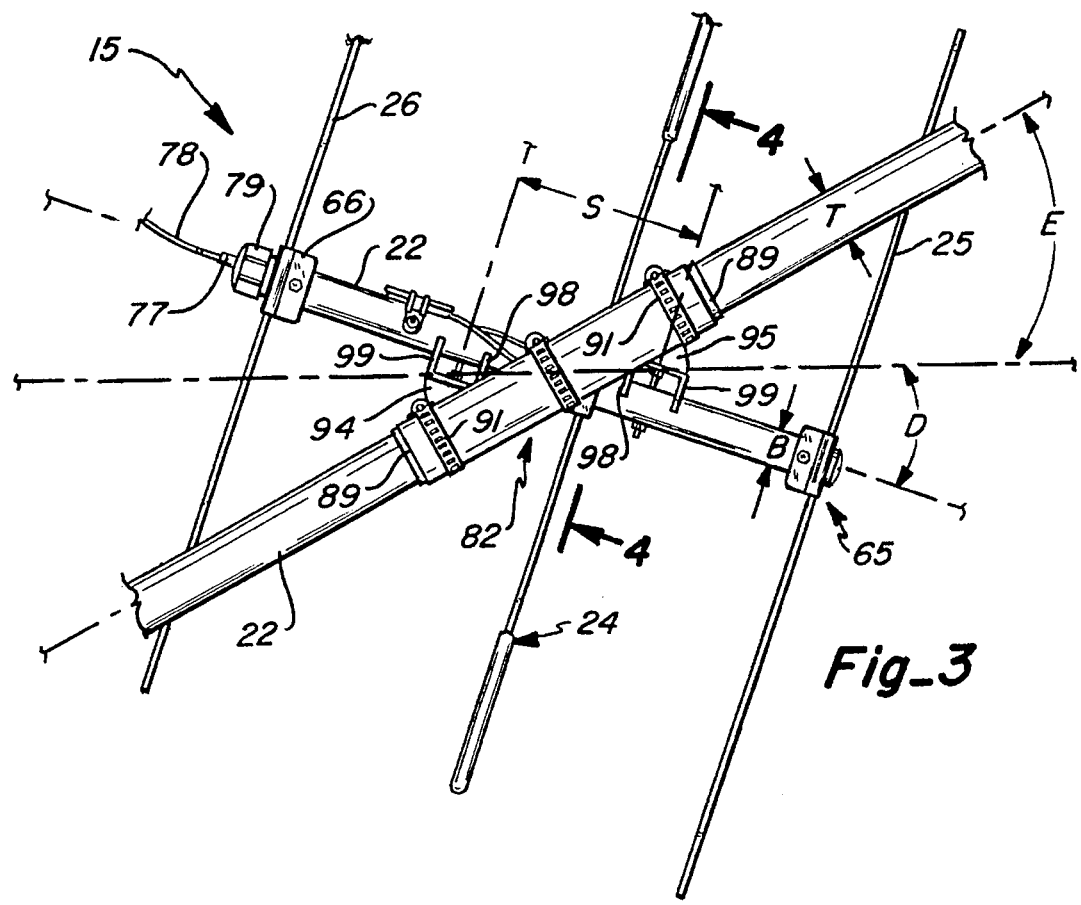
Fig_3
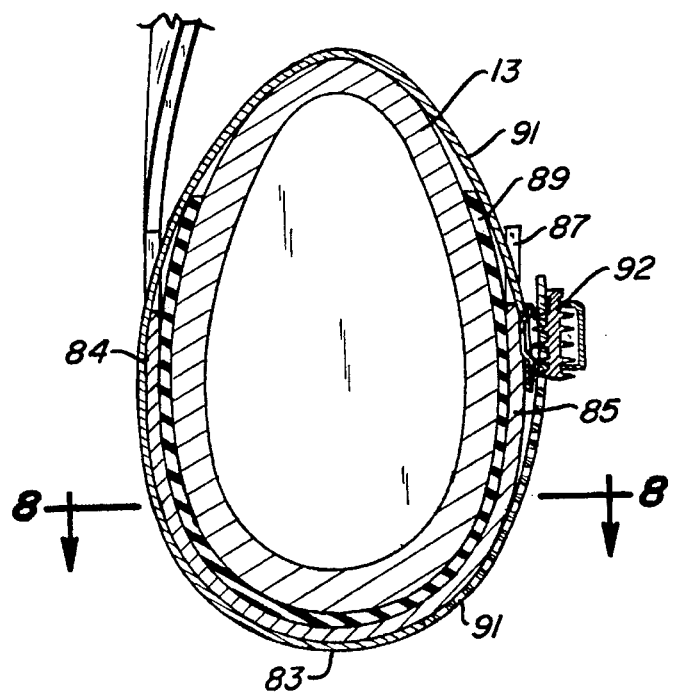
Fig_7

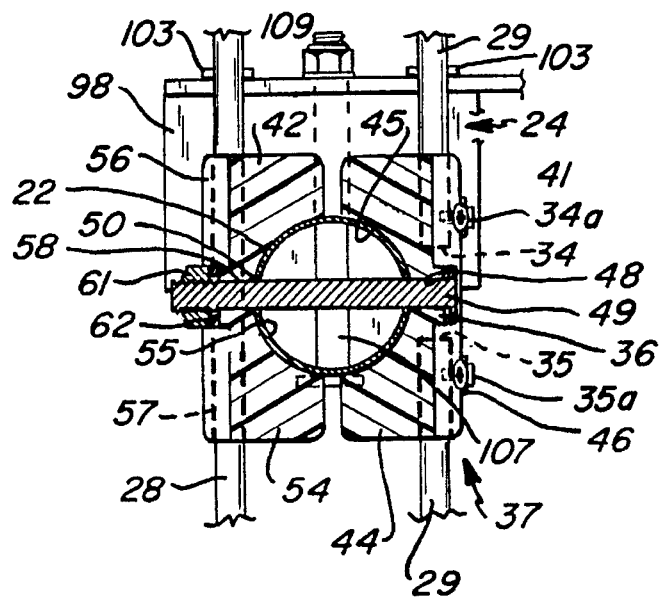
Fig_5
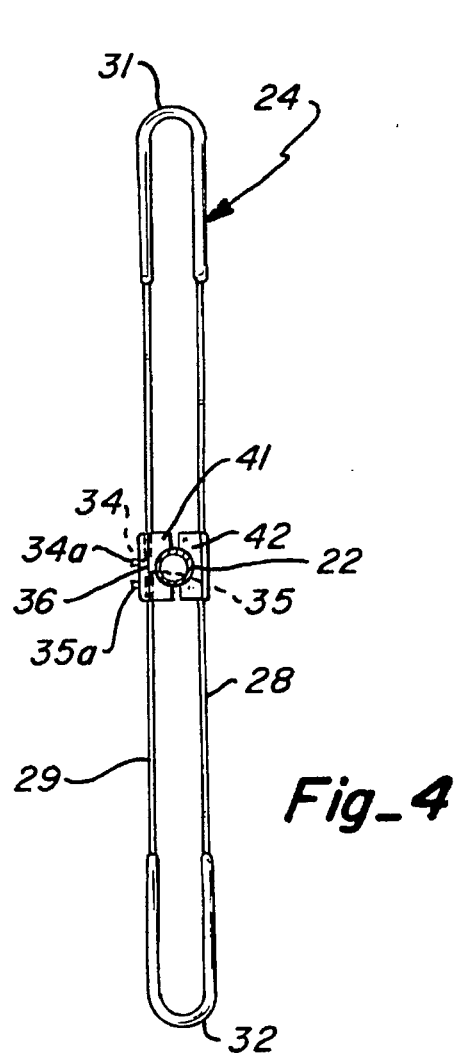
Fig_4
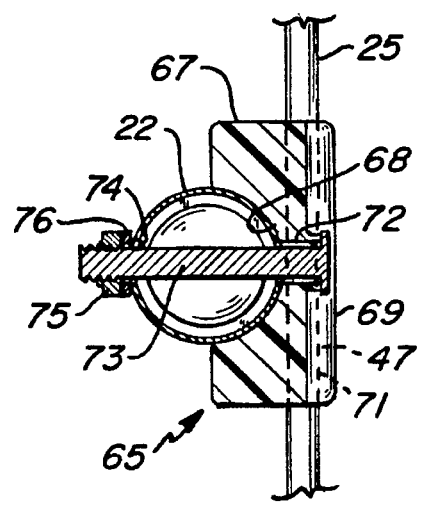
Fig_6

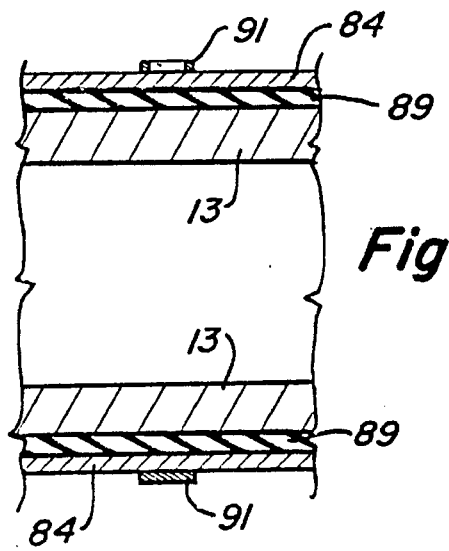
Fig_8
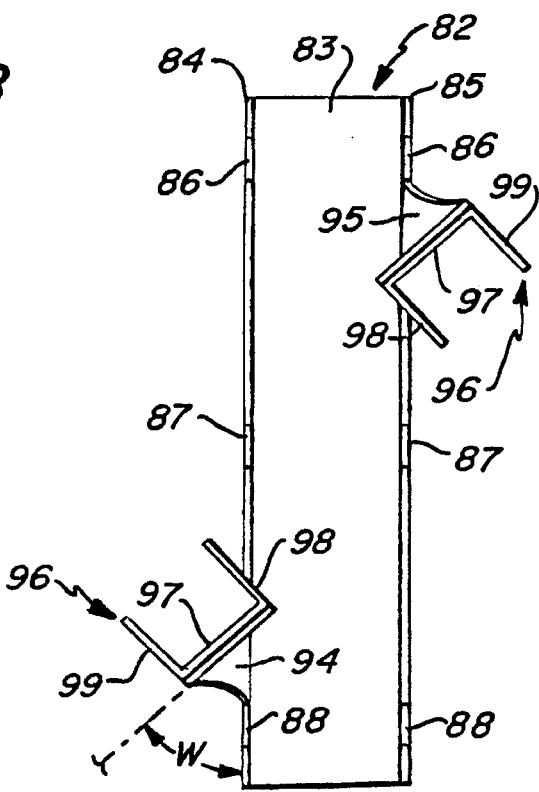
Fig_11
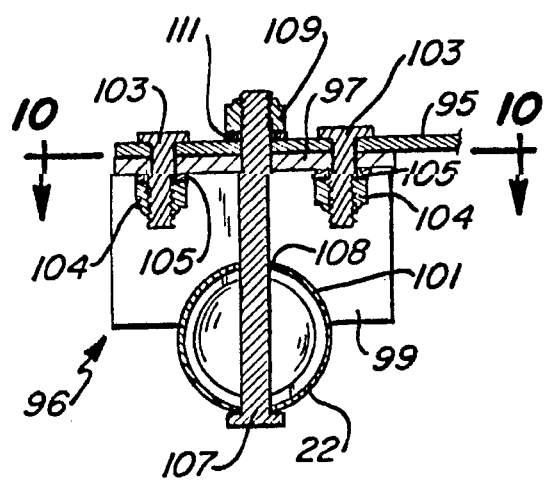
Fig_9
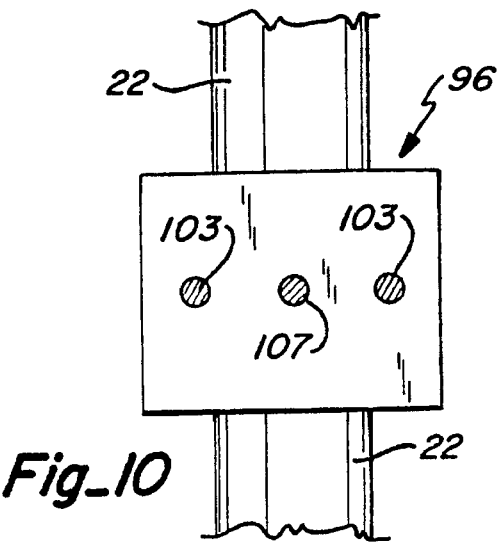
Fig_10

5,621,421

ANTENNA AND MOUNTING DEVICE AND SYSTEM

TECHNICAL FIELD

This invention in general relates to handling radio signals on an aircraft and more particularly an antenna and mounting device assembly and a signal handling system using two of said assemblies preferably to receive radio signals remote from the aircraft.

BACKGROUND ART

One of the most efficient methods for radio tracking far ranging animals equipped with radio beacons is to use an aircraft. To perform aerial tracking the aircraft must be equipped with one or more antennas fitted to the airplane in such a manner as to comply with FAA airworthiness standards. It is important to comply with the regulations to avoid grounding of the aircraft by the FAA, to avoid violation and possible cancellation of insurance policies to both personnel and aircraft and to release liability obligations. Any externally mounted structure on an aircraft must be tested to ensure that the device does not interfere with aircraft controls, reduce the strength of the aircraft or adversely affect flight characteristics.

An antenna mounted externally of an aircraft is disclosed in Bolljahn Ser. No. 2,505,751 having an antenna made of thin, flat, metal strips affixed to the ground plane by four angle pieces. Ganz Ser. No. 4,336,543 discloses an electronically scanned antenna system having a linear array of Yagi type endfire elements on the wing of an aircraft.

DISCLOSURE OF THE INVENTION

In accordance with the present invention, there is provided an antenna and a mounting device assembly that will fit on both the left and right sides of an aircraft, particularly an aircraft with a strut such as the Model 172 Cessna to handle and particularly receive signals transmitted remote from the aircraft. The antenna disclosed is of the Yagi type having a boom and suitable radiating elements fastened to the boom so as to provide a desirable signal reception pattern during flight. The mounting device includes a first clamping bracket that fits against the wing strut and has a plurality of spaced straps that encircle the first clamping bracket and the strut for releasably gripping the strut. Spaced first and second arms extend from the first clamping bracket and are twisted relative to the longitudinal axis of each arm at a selected angle to orient the antenna relative to the horizontal and carry second clamping means including first and second antenna clamping brackets that clamp to the antenna

BRIEF DESCRIPTION OF THE DRAWINGS

Details of this invention are described in connection with the accompanying drawings which like parts bear similar reference numerals in which:

FIG. 1 is a front elevation showing a signal reception system including left and right side assemblies on an aircraft embodying features of the present invention.

FIG. 2 is a top plan view as seen along line 2—2 of FIG. 1 of the left side assembly.

FIG. 3 is a front elevation view of the left side assembly as seen along line 3—3 of FIG. 2.

FIG. 4 is an end elevational view of the folded dipole element mounted to the boom as seen along line 4—4 of FIG. 3.

FIG. 5 is a sectional view taken along line 5—5 of FIG. 2.

FIG. 6 is a sectional view taken along line 6—6 of FIG. 2.

FIG. 7 is a sectional view taken along line 7—7 of FIG. 2.

FIG. 8 is a sectional view taken along line 8—8 of FIG. 7.

FIG. 9 is a sectional view taken along line 9—9 of FIG. 2.

FIG. 10 is a sectional view taken along line 10—10 of FIG. 9.

FIG. 11 is a top plan view of the mounting device without the antenna and strut shown.

DETAILED DESCRIPTION

Referring now to FIG. 1 there is shown a signal handling system for an aircraft 12 shown in schematic form as having a left side strut 13 and a right side strut 14. The signal handling system shown includes a left side antenna and mounting device assembly 15 and a right side antenna and mounting device assembly 16. The antenna and mounting device assemblies 15 and 16 are of the same construction and differ only in being constructed for left and right side mountings, respectively. A detailed description will now be made of the left side antenna and mounting device assembly 15.

The antenna 21 shown is of the Yagi type and comprises a boom 22 (FIGS. 2, 3 and 5) made of a preselected length of preferably aluminum tubing. There are three active elements mounted to the boom 22. The first active element 24 (FIGS. 1, 2 and 4) is the driven element, the second active element 25 is the director element and the third active element 26 is the reflector element. The driven element 24 is a folded dipole including two parallel spaced conductive rods, 28, 29, preferably aluminum, connected at the ends by two curved end sections 31 and 32. There is a gap or space 36 between the ends 34 and 35 midway between the ends of rod 29 which are the feed ends of the driven element 24. Feed ends 34 and 35 are connected to feed terminals 34a and 35a, respectively.

The folded dipole is matched for a 50 ohm receiving system by means of a half-wave balun phasing section 33 (FIG. 2) connected to the feed terminals. The folded dipole construction takes advantage of the additional mechanical strength and rigidity provided by having two parallel spaced rods.

The driven element 24 is mounted to the boom 22 by means of a first boom mounting device 37 (FIGS. 2 and 5) made of a nonconductive material. The mounting device 37 includes a front mounting member 41 and a rear mounting member 42 (FIGS. 4 and 5) each of which are a single, solid, molded, plastic body. The front mounting member 41 has an oblong base 44 with a semicircular recess 45 along a rear face to fit against and conform to the exterior surface of about half of the cross section of the boom 22. A raised portion 46 is offset to one side and projects forwardly of base 44. A hole 47 (FIG. 6) in the raised portion 46 and base 44 is provided through which the rod 29 extends and is rigidly fastened as by molding the rod in the molded body. A hole 48 extends through the center of the base and a bolt fastener 49 extends through the hole 48 and an aligned hole 50 in the boom.

The rear mounting member 42 is substantially a mirror image of the front mounting member 41 having an oblong base 54 with a semi-circular recess 55 in the front face of the base that conforms to the exterior surface of the boom 22, a raised portion 56 offset to one side with a hole 57 through which the rod 28 extends and is rigidly fastened by molding. A hole 58 in the base 54 is aligned with bolt hole 48 and the boom hole 50 through which the bolt fastener 49 extends. A nut 61 and washer 62 are on the end of fastener 49 with the nut threading on external threads of the bolt to firmly clamp the front and rear mounting members 41 and 42 (FIG. 4) against the boom by forces applied from opposite directions toward the center of the boom with the mounting device 37 functioning to electrically insulate the driven element 24 from the boom. The ends 34 and 35 of the element are shown clamped between the front and rear mounting members 41 and 42 with the feed terminals 34a and 35a (FIG. 4) being on the outer side of member 41.

The director element 25 (FIGS. 2, 3 and 6) and the reflector element 26 are each a single, straight aluminum rod and each are mounted to the boom and electrically insulated therefrom as is element 24. Element 25 is mounted to the boom by a nonconductive mounting member 65. Element 26 is mounted to the boom by a nonconductive mounting member 66. Members 65 and 66 are of the same construction so a description of one applies to both. Referring to member 65 it is a single, solid, molded, plastic body and shown to have an oblong base 67 with a semi-circular recess 68 on the rear face that fits against the boom 22 and encompasses about one half the cross section of the boom. An offset raised portion 69 is offset to one side and extends forwardly of the base 67. A hole 71 in the raised portion and base is provided through which element 25 extends and is rigidly fastened as by molding. A base hole 72 extends through the center of the base. A bolt fastener 73 extends through the base hole 72 and a hole 74 in the boom and is fastened thereto by a nut 75 threading on the fastener 73 with a washer 76 on the fastener between the nut and boom.

A coaxial cable connector 77 of the BNC type (FIG. 2) fits on a plastic (PVC) cap 79 that is mounted on the end of the boom 22 and a coaxial cable 78 extends from the connector 77 to the cab of the airplane for electrically connecting the boom to equipment inside the airplane cab. The connector 77 is electrically connected by an internal wire inside the boom (not shown) that connects to the feed terminals 34a and 35a (FIG. 4) so that energy transmitted through antenna element 24 is coupled to suitable equipment inside the cab.

Each mounting device 81 has a generally channel shaped strut clamping bracket 82 having a base 83 and spaced side walls 84 and 85 (FIGS. 2 and 7) extending away from the opposite sides of the base 83 with a cross section that is shaped to conform to and fit around the portion of the cross section of the strut 13 on which it is mounted. The side walls 84 and 85 extend through an arc greater than *180* degrees so the bracket 82 has substantial frictional engagement with the strut. The bracket 82 has three sets of aligned slots 86, 87 and 88 in the top edges of the side walls 84 and 85. These sets of slots are spaced from one another along the side walls, one at each end and one at an intermediate position midway between the ends. The mounting device is made from a flat plate, preferably rigid metal, having a rectangular body with the sets of slots 86, 87 and 88 formed in opposite side edges and the arms 94 and 95 described hereafter extending out in opposite directions at opposite ends, the plate being bent or shaped into the channel-shaped form shown particularly in FIG. 11 with the side walls 84 and 85 being parallel to one another.

A fastening strap 91 (FIGS. 2, 3, 7 and 8) fits in each set of slots, extends around the clamping bracket 82 and strut 13 and a clamp 92 at the ends of the strap is tightened to draw the strap down to firmly clamp the clamping bracket 82 to the strut 13. The mounting device has a pair of parallel spaced arms 94 and 95 (FIGS. 2, 3 and 11) that are twisted about their longitudinal axis in opposite directions so that they face in opposite directions. The angle of twist of each arm 94 and 95 designated W is about 47 degrees. A rectangular cushion or pad 89 (FIGS. 3, 7 and 8) is shown fitted between the clamping bracket 82 and strut 13.

Each of arms 94 and 95 carries a boom clamping bracket 96 (FIGS. 9 and 11) which is a generally U-shaped member having a base 97 and a pair of parallel spaced side walls 98 and 99 extending away from opposite sides of the base 97 with a pair of aligned, semi-circular notches 101 (FIG. 9) in the top edge of each of the side walls to receive and conform to about one half of the cross section of the boom 22. The base 97 is fastened to the arm 95 by two, spaced side bolts 103 on each side of the center of the bracket 96. A nut 104 is threaded on each side bolt 103 with a washer 105 between the nut and base 97. A center bolt 107 extends through a hole 108 in the boom, and holes in the center of the base 97 and arm 95. A nut 109 threads on the center bolt with a washer 111 between the nut 109 and arm 95 so that each clamping bracket 96 is firmly clamped to the antenna boom 22.

The active elements 24, 25 and 26 are disposed substantially vertically or upright at an angle of 75 degrees to the horizontal. In particular, the arms are rotated along a longitudinal axis through a selected angle to compensate for the angle of the boom designated E (about 30 degrees) and positions the boom at a selected angle D (about 15 degrees) relative to the horizontal. This supports the antenna rearwardly of the strut on the aircraft.

The equation for the calculation of the separation distance designated S for the arms of the mounting device 81 relative to the angle and thickness parameters shown in FIG. 3 is as follows:

$$S = 2 \left[ X^2 + \frac{T^2}{4 \sin^2(E)} + XT \cot(E) \right]^{1/2}$$

where, $$X = \frac{B \sin(E) - T \sin(D)}{2 \sin(E) \sin(E + D)}$$

where,
T—thickness of strut 13
B—diameter of antenna boom 22
E—elevation angle of strut 13
D—depression angle of boom 22
S—separation distance for arms 94 and 95

Although the present invention has been described with a certain degree of particularity, it is understood that the present disclosure has been made by way of example and that changes in details of structure may be made without departing from the spirit thereof.

What is claimed is:

1. A mounting device for mounting an antenna to an aircraft for handling radio signals during flight, said device comprising:

first clamping means including an aircraft clamping bracket for gripping an external portion of a strut of an aircraft, arm means extending out from said first clamping means and having opposite ends, said first clamping means at one of said ends, said arm means including a pair of spaced rigid arms that are twisted along a longitudinal axis in opposite directions through preselected angles to be oriented relative to said first clamping means at a selected fixed angle relative to an axis normal to said first clamping means for positioning said antenna relative to said strut at a selected separation distance from the aircraft and at a preselected limed angle of elevation to the horizontal, and second clamping means at the other end of said arm means opposite said first clamping means for gripping said antenna.

2. A mounting device for mounting an antenna to an aircraft for handling radio signals during flight, said device comprising:

first clamping means including an aircraft clamping bracket for gripping an external portion of a strut of an aircraft, arm means extending out from said first clamping means and having opposite ends, said first clamping means at one of said ends, said arm means oriented relative to said first clamping means at a selected angle relative to an axis normal to said first clamping means for positioning said antenna relative to said strut at a selected separation distance from the aircraft and at a preselected angle of elevation to the horizontal, said arm means including a pair of spaced arms that are twisted along a longitudinal axis in opposite directions through preselected angles, and second clamping means at the other end of said arm means opposite said first clamping means for gripping said antenna, said second clamping means including a pair of second clamping brackets that are disposed by said spaced arms in oppositely facing directions.

3. A mounting device as set forth in claim 2 wherein said aircraft clamping bracket is a generally U-shaped member having a base and spaced side walls extending away from opposite sides of said base.

4. A mounting device as set forth in claim 2 wherein the angle of twist is about 47 degrees.

5. A mounting device as set forth in claim 2 wherein said second clamping means includes a pair of second clamping brackets that fit against and are clamped to said antenna.

6. A mounting device for mounting an antenna having a boom and a plurality of active elements to a wing strut of an aircraft for aerial reception of radio signals by the antenna during flight, said device comprising:

first clamping means including a strut clamping bracket having a base and spaced side walls extending away from said base, said first clamp means being sized to fit around a portion of an aircraft strut around which strap means extend for gripping said strut, arm means including a pair of spaced first and second arms transverse to and extending out from said first clamping means, said first and second arms each having opposite ends, said first clamping means at one of said ends, said arms being twisted along a longitudinal axis in opposite directions through a preselected angle for positioning said boom relative to said strut at a selected separation distance from the aircraft and at a preselected angle of elevation to the horizontal, and second clamping means including a pair of second antenna clamping brackets fastened at the other ends of said first and second arms, respectively, for gripping said antenna.

7. A mounting device as set forth in claim 6 wherein said strut clamping bracket is a generally U-shaped member having a base and spaced side walls extending away from opposite sides of said base and wherein said spaced side walls have a plurality of spaced sets of aligned slots in the top edges at intermediate and end positions.

8. A mounting device as set forth in claim 7 wherein said strap means includes a strap disposed in each of said sets of aligned slots, each strap having a clamp to selectively tighten said strap around said base and side walls and wing strut.

9. A mounting device as set forth in claim 6 wherein each of said second antenna clamping brackets includes a generally U-shaped member having a base and spaced side walls extending away from opposite sides of said base, said side walls having a plurality of notches shaped to conform to and receive a portion of the cross section of the boom, and an opposite clamping bracket with fastening bolts clamping each antenna clamping bracket toward the opposite antenna clamping bracket and against the antenna.

10. An antenna and mounting device assembly for an in flight aircraft comprising:

an antenna, a mounting device for fastening said antenna to an external portion of a strut of an aircraft, said mounting device including first clamping means including an aircraft clamping bracket shaped to fit around an external portion of an aircraft for gripping said external portion, arm means extending out from said first clamping means and having opposite ends, said first clamping means at one of said ends, said arm means including a pair of rigid spaced arms that are twisted along a longitudinal axis in opposite directions through preselected angles to be oriented relative to an axis normal to said first clamping means at a selected fixed angle for positioning said antenna relative to said strut at a selected separation distance from the aircraft and at a preselected fixed angle of elevation to the horizontal, and second clamping means at the other end of said arm means opposite said first clamping means for gripping said antenna.

11. An assembly as set forth in claim 10 wherein said antenna is of the Yagi type having a boom in the form of a length of conductive tubing, a driven element mounted between the ends of the boom, a director element mounted at one end of the boom and a reflector element mounted at the other end of the boom.

12. An assembly as set forth in claim 11 wherein said driven element is a folded dipole including two parallel spaced conductive rods connected at the ends by two curved conductive end sections, an intermediate section of one of said conductive rods being separated to form spaced ends to provide the feed ends for said driven element.

13. An antenna and mounting device assembly for an in flight aircraft comprising:

an antenna, said antenna being of the Yagi type having a boom in the form of a length of conductive tubing, a driven element mounted between the ends of the boom, a director element mounted at one end of the boom and a reflector element mounted at the other end of the boom, a mounting device for fastening said antenna to an external portion of a strut of an aircraft, said mounting device including first clamping means including an aircraft clamping bracket shaped to fit around an external portion of an aircraft for gripping said external portion, arm means extending out from said first clamping means and having opposite ends, said first clamping means at one of said ends, said arm means oriented relative to an axis normal to said first clamping means for positioning said antenna relative to said strut at a selected separation distance from the aircraft and at a preselected angle of elevation to the horizontal, second clamping means at the other end of said arm means opposite said first clamping means for gripping said antenna, and a mounting member for mounting each of said driven, director and reflector elements to said boom, each mounting member being made of a nonconductive material having an oblong base with a recess shaped to conform to a portion of the cross section of said boom to fit against said boom, an offset portion through which an associated element extends and is rigidly secured and a hole through which a bolt fastener extends to which a nut is threaded to clamp said mounting member to said boom.

14. An assembly as set forth in claim 13 wherein said mounting member is a molded material and each said element is molded in said molded material.

15. An assembly as set forth in claim 13 wherein each of said driven, director and reflector elements having two parallel spaced rods, there being a pair of said mounting members for each of said elements with one of said rods of each pair affixed to one of said mounting members of each pair, each pair of mounting members having aligned holes and bolt fasteners extending through each pair of said mounting members with nuts on said bolt fasteners to clamp said mounting members against said boom.

16. An antenna and mounting device assembly for an in flight aircraft having a wing strut comprising:

an antenna having a boom and a plurality of active elements each mounted to the boom by a mounting member for receiving radio signals, a mounting device for fastening said antenna to a wing strut of an aircraft, said mounting device including first clamping means including a strut clamping bracket having a base and spaced side walls sized and shaped to fit around a portion of an aircraft strut around which strap means extend for gripping said strut, arm means including a pair of spaced first and second arms transverse to and extending out from said first clamping means for positioning said antenna relative to said strut, and second clamping means including a pair of first and second antenna clamping brackets fastened at the ends of said first and second arms respectively, for gripping said antenna, whereby said antenna will receive radio signals during flight of said aircraft.

17. An assembly as set forth in claim 16 that is constructed with dimensions substantially according to the equation $$S = 2\left[ X^2 + \frac{T^2}{4\sin^2(E)} + XT\cot(E) \right]^{1/2}$$

wherein, $$X = \frac{B\sin(E) - T\sin(D)}{2\sin(E)\sin(E+D)} \text{ and}$$

wherein T is the thickness of said strut,

B is the diameter of said boom,

E is the elevation angle of said strut,

D is the depression angle of said boom, and

S is the separation distance for said arms.

18. An assembly as set forth in claim 16 wherein said side walls extend through an arc greater than 180 degrees to firmly secure said mounting device to said strut.

19. An aerial signal reception system for an in flight aircraft having a left side and a right side comprising:

a left side antenna and mounting device assembly mounted to a left side of the aircraft, a right side antenna and mounting device assembly mounted to a right side of the aircraft, each said antenna including a boom to which are attached active elements, the active elements including a folded dipole driven element clamped to the boom intermediate the ends of the boom, a director element clamped to the boom at one end and a reflector element clamped to the boom at the other end, each said mounting device including first clamping means including a strut clamping bracket shaped to fit around an external portion of an aircraft around which strap means extend for gripping said external portion, arm means including a pair of spaced first and second arms transverse to and extending out from said first clamping means, and second clamping means including a pair of first and second antenna clamping brackets fastened to said first and second arms, respectively, for gripping said antenna to position said antenna relative to said strut for aerial reception of radio signals during flight.

20. An aerial signal reception system as set forth in claim 19 wherein said angle of elevation of said strut to the horizontal is about 30 degrees and said angle of depression of said boom to the horizontal is about 15 degrees.

21. An external aerial signal reception system for an in flight aircraft having a left side wing strut and a right side wing strut comprising:

a left side antenna and mounting device assembly mounted to a left side wing strut, a right side antenna and mounting device assembly mounted to a right side wing strut, each said antenna including a boom to which are attached active elements, the active elements including a folded dipole driven element clamped to the boom intermediate the ends of the boom, a director element clamped to the boom at one end and a reflector element clamped to the boom at the other end, each said mounting device including first clamping means including a strut clamping bracket having a base wall and spaced side walls sized and shaped to fit around a portion of an aircraft strut around which strap means extend for gripping said strut, arm means including a pair of spaced first and second arms transverse to and extending out from said first clamping means, and second clamping means including a pair of first and second antenna clamping brackets fastened to said first and second arms, respectively, for gripping said antenna to position said antenna relative to said strut for aerial reception of radio signals during flight.

* * * * *